United States Patent
Ha et al.

(10) Patent No.: US 12,089,127 B2
(45) Date of Patent: Sep. 10, 2024

(54) METHOD AND DEVICE FOR PROVIDING UWB SERVICE

(71) Applicant: Samsung Electronics Co., Ltd., Suwon-si (KR)

(72) Inventors: Taeyoung Ha, Suwon-si (KR); Mingyu Lee, Suwon-si (KR); Sooyeon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 17/837,812

(22) Filed: Jun. 10, 2022

(65) Prior Publication Data

US 2022/0400366 A1    Dec. 15, 2022

(30) Foreign Application Priority Data

Jun. 11, 2021   (KR) .................... 10-2021-0076353

(51) Int. Cl.
*H04B 1/00*   (2006.01)
*H04B 1/7163*   (2011.01)
*H04W 4/80*   (2018.01)

(52) U.S. Cl.
CPC ............ *H04W 4/80* (2018.02); *H04B 1/7163* (2013.01)

(58) Field of Classification Search
CPC .............. H04B 1/707; H04B 1/7075; H04B 2201/71346; G01S 5/14; G01S 1/08; H04L 69/18; H04L 4/12; H04L 9/30; H04W 12/06; H04W 8/183
USPC ....................................... 375/141
See application file for complete search history.

(56) References Cited

U.S. PATENT DOCUMENTS

| 9,769,686 | B2 | 9/2017 | Kang et al. | |
| 2018/0007544 | A1* | 1/2018 | Grassel | H04W 4/50 |
| 2019/0135229 | A1 | 5/2019 | Ledvina et al. | |
| 2020/0062217 | A1 | 2/2020 | Ledvina et al. | |
| 2020/0106877 | A1* | 4/2020 | Ledvina | H04L 9/30 |
| 2020/0305142 | A1 | 9/2020 | Jang et al. | |
| 2020/0371715 | A1* | 11/2020 | Lee | G06F 3/0673 |

(Continued)

FOREIGN PATENT DOCUMENTS

WO    2020/210923 A1    10/2020

OTHER PUBLICATIONS

Leo Botler et al., Direction Finding with UWB and BLE: A Comparative Study, published in: 2020 IEEE 17th International Conference on Mobile Ad Hoc and Sensor Systems (MASS), Feb. 23, 2021, sections II-V.

(Continued)

*Primary Examiner* — Khai Tran
(74) *Attorney, Agent, or Firm* — Jefferson IP Law, LLP

(57) ABSTRACT

A method for operating a plurality of ultra-wide band (UWB) channels by a first electronic device is provided. The method includes receiving a Bluetooth low energy (BLE) advertisement message including information about an UWB channel, from a second electronic device, identifying whether a plurality of UWB channels are operated, based on the information about the UWB channel, and identifying a UWB channel to be used for communication with the second electronic device, based on the information about the UWB channel. The information about the UWB channel may include flag information indicating an area and channel information indicating a UWB channel for the indicated area.

20 Claims, 14 Drawing Sheets

(56) References Cited

U.S. PATENT DOCUMENTS

2021/0041526 A1* 2/2021 Luomi .................... G01S 5/02
2022/0410802 A1* 12/2022 Aladas ................. B60W 50/16

OTHER PUBLICATIONS

International Search Report dated Sep. 7, 2022, issued in International Application No. PCT/KR2022/008256.
Extended European Search Report dated Dec. 18, 2023; European Appln. No. 22820620.7-1213 PCT/KR2022008256.

* cited by examiner

METHOD AND DEVICE FOR PROVIDING UWB SERVICE

CROSS-REFERENCE TO RELATED APPLICATION(S)

This application is based on and claims priority under 35 U.S.C. § 119(a) of a Korean patent application number 10-2021-0076353, filed on Jun. 11, 2021, in the Korean Intellectual Property Office, the disclosure of which is incorporated by reference herein in its entirety.

BACKGROUND

1. Field

The disclosure relates to an ultra-wide band (UWB) communication. More particularly, the disclosure relates to a method and a device for providing a UWB service.

2. Description of Related Art

The Internet is evolving from a human-centered connection network in which humans create and consume information to an Internet of things (IoT) in which information is exchanged and processed between distributed components, such as objects. Internet of everything (IoE) technology is also emerging and is a combination of a big data processing technology based on a connection to a cloud server and the IoT technology. To implement the IoT, technology elements, such as detection technology, wired/wireless communication and network infrastructure, service interface technology, and security technology are required. Recently, technologies, such as a sensor network, machine to machine (M2M), and machine type communication (MTC) have been studied for connection between objects.

In the IoT environment, an intelligent Internet technology (IT) service that collects and analyzes data generated from connected objects and thus creates new values in human life may be provided. The IoT may find its applications in the fields of a smart home, a smart building, a smart city, a smart car or a connected car, a smart grid, healthcare, a smart home appliance, an advanced medical service, and so on through convergence and merging between the existing information technology and various industries.

As various services may be provided along with the development of wireless communication systems, a method of effectively providing these services does not exist in the prior art and therefore is required. For example, a ranging technique for measuring a distance between electronic devices by using UWB may be used.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for providing a UWB service for multiple users. The disclosure also proposes a method for operating a plurality of UWB channels to reduce service delay.

Additional aspects will be set forth in part in the description which follows and, in part, will be apparent from the description, or may be learned by practice of the presented embodiments.

In accordance with an aspect of the disclosure, a method by a first electronic device is provided. The method includes receiving a Bluetooth low energy (BLE) advertisement message including information about an ultra-wide band (UWB) channel, from a second electronic device, identifying whether a plurality of UWB channels are operated, based on the information about the UWB channel, and identifying a UWB channel to be used for communication with the second electronic device, based on the information about the UWB channel. The information about the UWB channel may include flag information indicating an area and channel information indicating a UWB channel for the indicated area.

In accordance with another aspect of the disclosure, a method by a second electronic device is provided. The method includes broadcasting a BLE advertisement message including information about a UWB channel and communicating with a first electronic device using a UWB channel determined based on the information about the UWB channel. The information about the UWB channel may include flag information indicating an area and channel information indicating a UWB channel for the indicated area.

It is possible to efficiently provide a service for multiple users through a scheme for providing a UWB service according to the disclosure. It is also possible to reduce service delay through a scheme for operating a plurality of UWB channels according to the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
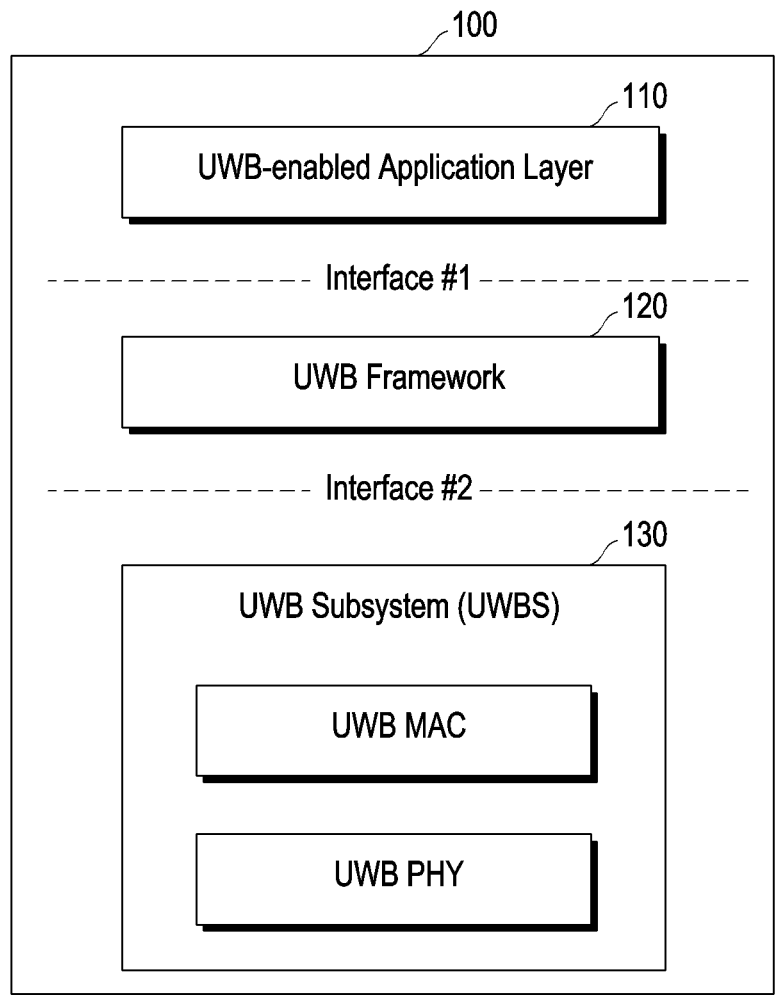
FIG. 1 illustrates an architecture of an ultra-wide band (UWB) device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element, such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card. According to embodiments of the disclosure, a " . . . unit" may include one or more processors.

As used herein, the term 'terminal' or 'device' may also be referred to as a mobile station (MS), a user equipment (UE), a user terminal (UT), a terminal, a wireless terminal, an access terminal (AT), a subscriber unit, a subscriber station (SS), a wireless device, a wireless communication device, a wireless transmit/receive unit (WTRU), a mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include a machine to machine (M2M) terminal and a machine-type communication (MTC) terminal/device, but is not limited thereto. In an embodiment of the disclosure, the terminal may be referred to as an electronic device or simply as a device.

Hereinafter, the operational principle of the disclosure is described below with reference to the accompanying drawings. When determined to make the subject matter of the disclosure unclear, the detailed of the known functions or configurations may be skipped. The terms as used herein are defined considering the functions in the disclosure and may be replaced with other terms according to the intention or practice of the user or operator. Therefore, the terms should be defined based on the overall disclosure.

Hereinafter, embodiments of the disclosure are described with reference to the accompanying drawings. Further, although a communication system using UWB is described in connection with embodiments of the disclosure, as an example, embodiments of the disclosure may also apply to other communication systems with similar technical background or features. For example, a communication system using Bluetooth or ZigBee may be included therein. Further, embodiments of the disclosure may be modified in such a range as not to significantly depart from the scope of the disclosure under the determination by one of ordinary skill in the art and such modifications may be applicable to other communication systems.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 m. WPAN is a technology based on IEEE 802.15 which includes Bluetooth, ZigBee, and ultra-wide band (UWB). A wireless network in which such a wireless network technology is implemented may include a plurality of electronic devices.

UWB may refer to a short-range high-rate wireless communication technology using a wide frequency band of several gigahertz (GHz) or more, low spectral density, and short pulse width (e.g., 1 nsec to 4 nsec) in a baseband state. UWB may mean a band itself to which UWB communication is applied. UWB may enable secure and accurate ranging between devices. Thus, UWB enables relative location estimation based on the distance between two devices or accurate location estimation of a device based on the distance from fixed devices (whose locations are known).

The terminology used herein is provided for a better understanding of the disclosure, and changes may be made thereto without departing from the technical spirit of the disclosure.

"Application dedicated file (ADF)" may be, e.g., a data structure in an application data structure that may host an application or application specific data.

"Application protocol data unit (APDU)" may be a command and a response used when communicating with the application data structure in the UWB device.

"Application specific data" may be, e.g., a file structure having a root level and an application level including UWB controllee information and UWB session data required for a UWB session.

"Controller" may be a ranging device that defines and controls ranging control messages (RCM) (or control messages). The controller may define and control ranging features by sending the control message.

"Controllee" may be a ranging device using a ranging parameter in the RCM (or control message) received from the controller. The controlee may utilize the ranging features as configured via the control message from the controller.

Unlike "static STS," "dynamic scrambled timestamp sequence (STS) mode" may be an operation mode in which the STS is not repeated during a ranging session. In this mode, the STS may be managed by the ranging device, and the ranging session key that generates STS may be managed by a secure component.

"Applet" may be, e.g., an applet executed on the secure component including UWB parameters and service data. In this disclosure, Applet may be a FiRa Applet.

"Ranging device" may be a device capable of performing UWB ranging. In an embodiment of the disclosure, the ranging device may be an enhanced ranging device (ERDEV) defined in IEEE 802.15.4z or a FiRa Device. The ranging device may be referred to as a UWB device.

"UWB-enabled application" may be an application for UWB service. For example, the UWB-enabled Application may be an application using a framework API for configuring an OOB connector, a secure service, and/or a UWB service for a UWB session. In this disclosure, "UWB-enabled Application" may be abbreviated as an application or a UWB application. UWB-enabled Application may be a FiRa-enabled Application.

"Framework" may be a component that provides access to profiles, individual-UWB settings and/or notifications. "Framework" may be, e.g., a collection of logical software components including a profile manager, OOB connector, a secure service, and/or UWB service. In an embodiment of the disclosure, the framework may be a FiRa framework.

"OOB Connector" may be a software component for establishing an out-of-band (OOB) connection (e.g., a Bluetooth low energy (BLE) connection) between ranging devices. In an embodiment of the disclosure, the OOB connector may be a FiRa OOB connector.

"Profile" may be a previously defined set of UWB and OOB configuration parameters. In an embodiment of the disclosure, a profile may be a FiRa profile.

"Profile manager" may be a software component that implements a profile available on the ranging device. In an embodiment of the disclosure, the profile manager may be a FiRa profile manager.

"Service" may be an implementation of a use case that provides a service to an end-user.

"Smart ranging device" may be a ranging device that may implement an optional framework API. In an embodiment of the disclosure, the smart ranging device may be a FiRa smart device.

"Global dedicated file (GDF)" may be a root level of application specific data including data required to establish a USB session.

"Framework API" may be an API used by a UWB-enabled application to communicate with the framework.

"Initiator" may be a ranging device that initiates a ranging exchange. The initiator may initiate the ranging exchange by sending the first RFRAME (ranging initiation message).

"Object identifier (OID)" may be an identifier of the ADF in the application data structure.

"Out-of-band (OOB)" may be data communication that does not use UWB as an underlying wireless technology.

"Ranging data set (RDS)" may be data (e.g., a UWB session key, a session ID, or the like) required to establish a UWB session when it is needed to protect confidentiality, authenticity and integrity.

"Responder" may be a ranging device that responds to the initiator in a ranging exchange. The responder may respond to the ranging initiation message received from the initiator.

"STS" may be a ciphered sequence for increasing the integrity and accuracy of ranging measurement timestamps. The STS may be generated from the ranging session key.

"Secure channel" may be a data channel that prevents overhearing and tampering.

"Secure component" may be an entity (e.g., a secure element (SE) or a trusted execution environment (TEE)) having a defined security level that interfaces with a UWB subsystem (UWBS) for the purpose of providing RDS to UWBS, e.g., when dynamic STS is used.

"Secure element (SE)" may be a tamper-resistant secure hardware component that may be used as a secure component in the ranging device.

"Secure ranging" may be ranging based on STS generated through a strong encryption operation.

"Secure service" may be a software component for interfacing with a secure component, such as a secure element or trusted execution environment (TEE).

"Service applet" may be an applet on a secure component that handles service specific transactions.

"Service data" may be data defined by a service provider that needs to be transferred between two ranging devices to implement a service.

"Service provider" may be an entity that defines and provides hardware and software required to provide a specific service to an end-user.

"Static STS mode" is an operation mode in which STS is repeated during a session, and does not need to be managed by the secure component.

"Secure UWB service (SUS) applet" may be an applet on the SE that communicates with the applet to retrieve data needed to enable secure UWB sessions with other ranging devices. The SUS applet may transfer corresponding data (information) to the UWBS.

"UWB service" may be a software component that provides access to the UWBS.

"UWB session" may be a period from when the controller and the controllee start communication through UWB until the communication stops. A UWB session may include ranging, data transfer, or both ranging and data transfer.

"UWB session ID" may be an ID (e.g., a 32-bit integer) that identifies the UWB session, shared between the controller and the controller.

"UWB session key" may be a key used to protect the UWB session. The UWB session key may be used to generate the STS. In this disclosure, the UWB session key may be a UWB ranging session key (URSK), and may be abbreviated as a session key.

"UWB subsystem (UWBS)" may be a hardware component implementing the UWB PHY and MAC specifications. UWBS may have an interface to Framework and an interface to secure component to search for RDS.

When determined to make the subject matter of the disclosure unclear, the detailed description of the known art or functions may be skipped.

Hereinafter, various embodiments of the disclosure are described with reference to the accompanying drawings.

FIG. 1 illustrates an architecture of a UWB device according to an embodiment of the disclosure.

Referring to FIG. 1, a UWB device (e.g., an electronic device) 100 of FIG. 1 may be a ranging device supporting UWB ranging (e.g., UWB secure ranging). In an embodiment of the disclosure, the ranging device may be an enhanced ranging device (ERDEV) defined in IEEE 802.15.4z or a FiRa device.

Referring to FIG. 1, the UWB device 100 may interact with other UWB devices through a UWB session.

The UWB device 100 may implement a first interface (Interface #1) that is an interface between a UWB-enabled Application 110 and a framework 120, and the first interface allows the UWB-enabled application 110 on the UWB device 100 to use the UWB capabilities of the UWB device 100 in a predetermined manner. In an embodiment of the disclosure, the first interface may be a Framework API or a proprietary interface, but is not limited thereto.

The UWB device 100 may implement a second interface (Interface #2) that is an interface between the framework 120 and a UWB subsystem (UWBS) 130. In an embodiment of the disclosure, the second interface may be a UWB command interface (UCI) or proprietary interface, but is not limited thereto.

Referring to FIG. 1, the UWB device 100 may include a UWB-enabled application 110, a framework 120, and/or the UWBS 130 including a UWB MAC layer and a UWB physical layer. Depending on the embodiment of the disclosure, some entities may not be included in the UWB device 100, or additional entities (e.g., security layer) may be further included.

The UWB-enabled Application 110 may trigger establishment of a UWB session by the UWBS 130 through the first interface. The UWB-enabled Application 110 may use one of previously defined profiles (profile). For example, the UWB-enabled application 110 may use one of the profiles defined in FiRa or a custom profile. The UWB-enabled application 110 may use the first interface to handle related events, such as service discovery, ranging notifications, and/or error conditions.

The framework 120 may provide access to profiles, individual-UWB settings and/or notifications. The framework 120 may be a set of software components. As described above, the UWB-enabled application 110 may interface with the framework 120 through the first interface, and the framework 120 may interface with the UWBS 130 through the second interface. Software components of the framework 120 may include, e.g., a profile manager, OOB connector, a secure service, and/or UWB service.

The profile manager may serve to manage profiles available on the UWB device 100. Profile may be a set of parameters required to establish communication between UWB devices 100. For example, a profile may include a parameter indicating which OOB secure channel is used, a UWB/OOB configuration parameter, a parameter indicating whether the use of a particular secure component is mandatory, and/or a parameter related to the file structure of the ADF.

The OOB connector may play a role to establish OOB connection between UWB devices. The OOB connector may handle an OOB step including a discovery step and a connection step. The OOB step is described below with reference to FIG. 4.

The secure service may play a role of interfacing with a secure component, such as SE or TEE.

The UWB Service may perform a role of managing the UWBS 130. The UWB service may provide access to the UWBS 130 from the profile manager by implementing the second interface.

The UWBS 130 may be a hardware component including a UWB MAC layer and a UWB physical layer. The UWBS 130 may perform UWB session management and may communicate with the UWBS of another UWB device. The UWBS 130 may interface with the framework 120 through the second interface and may obtain the RDS from the secure component.

Figure 2:
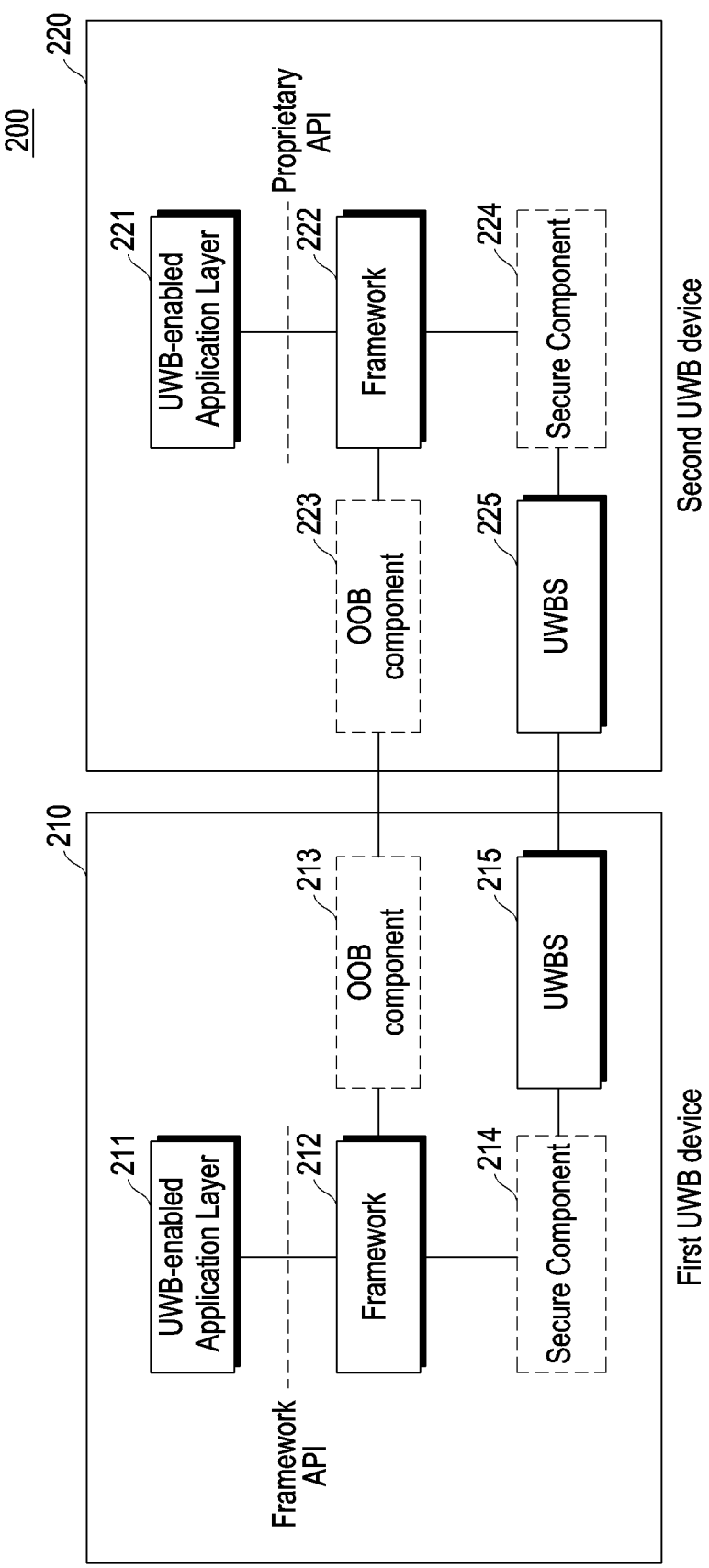
FIG. 2 illustrates a configuration of a communication system including a UWB device according to an embodiment of the disclosure.

FIG. 2 illustrates a configuration of a communication system including a UWB device according to an embodiment of the disclosure.

Referring to FIG. 2, a communication system 200 includes a first UWB device 210 and a second UWB device 220. In an embodiment of the disclosure, the first UWB device 210 and the second UWB device 220 may be, e.g., the UWB device 100 of FIG. 1 or an electronic device including the UWB device 100 of FIG. 1.

The first UWB 210 may host, e.g., one or more UWB-enabled applications 211, which may be installed by the user (e.g., a mobile phone). It may be based on, e.g., the framework API. The second UWB 220 does not provide a framework API, and for example, may use a proprietary interface to implement a specific UWB-enabled application. Unlike shown, according to an embodiment of the disclosure, both the first UWB device 210 and the second UWB device 220 may be ranging devices using the framework API, or both the first UWB device 210 and the second UWB device 220 may be ranging devices using the proprietary interface.

The first UWB device 210 and the second UWB device 220 may include a UWB-enabled application layer 211,221, a framework 212,222, an OOB component 213,223, a secure component 214,224, and/or a UWBS 215,225. In an embodiment of the disclosure, the OOB component 213,223 and/or the secure component 214,224 may be optional components and, according to an embodiment of the disclosure, may not be included in the UWB device.

The framework 212,222 may serve to provide access to profiles, individual-UWB settings and/or notifications. The framework 212,222 may be a set of software components and may include, e.g., a profile manager, OOB connector, a secure service, and/or UWB service. For a description of each component, refer to the above description.

The OOB components 213,223 may be hardware components including a MAC layer and/or a physical layer for OOB communication (e.g., a BLE communication). The OOB components 213,223 may communicate with OOB components of other devices. In an embodiment of the disclosure, the first UWB device 210 and the second UWB device 220 may create an OOB connection (channel) using the OOB components and exchange parameters for establishing a UWB session through the OOB channel. In this disclosure, the OOB components 213,223 may be referred to as OOB subsystems.

The UWBS 215,225 may be a hardware component including a UWB MAC layer and a UWB physical layer. The UWBS 215,225 may perform UWB session management and may communicate with the UWBS of another UWB device. In an embodiment of the disclosure, the first UWB device 210 and the second UWB device 220 may perform transaction of service data and UWB ranging through the UWB session established through the UWBSs using the exchanged parameters.

The secure components 214,224 may be hardware components that interface with the framework 212,222 and/or UWBS 215,225 to provide RDS.

In an embodiment of the disclosure, the UWB-enabled application layers and/or the frameworks may be implemented by an application processor (AP) (or processor). Accordingly, in an embodiment of the disclosure, it may be understood that the operations of the UWB-enabled application layers and/or the frameworks are performed by an AP (or a processor).

Figure 3A:
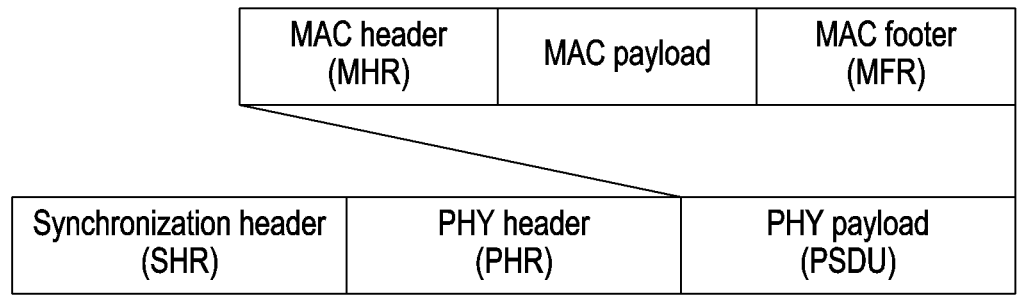
FIGS. 3A and 3B illustrate a structure of a frame used for UWB communication according to various embodiments of the disclosure.
Figure 3B:
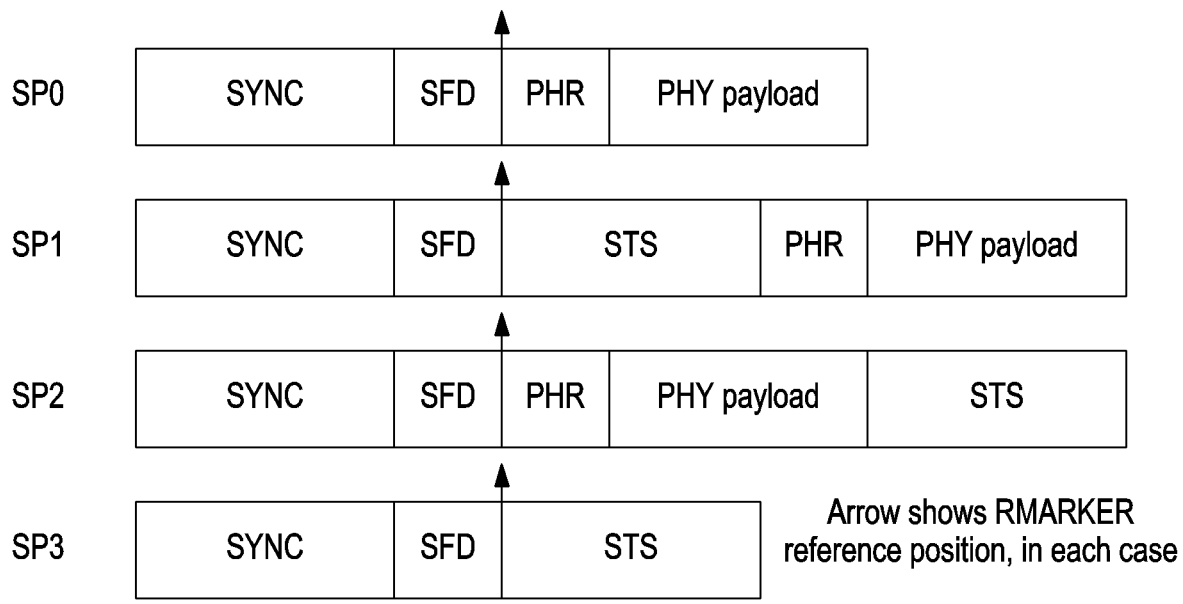

FIGS. 3A and 3B illustrate a structure of a frame used for UWB communication according to various embodiments of the disclosure.

FIG. 3A illustrates a structure of a frame to which the STS packet configuration is not applied, and FIG. 3B illustrates a structure of a frame to which the STS packet configuration is applied. In an embodiment of the disclosure, the frame may be a ranging frame (RFRAME) for transferring ranging data (e.g., a ranging initiation/reply/final message, or the like) or a data frame for transferring other data (e.g., service data, or the like).

Referring to FIG. 3A, the frame or a PHY PDU (PPDU) for transferring the frame may include a synchronization header (SHR), a PHY header (PHR), and a PHY payload (PSDU). The PSDU may include a MAC frame. The MAC frame may include a MAC header (MHR), a MAC payload and/or a MAC footer (MFR). The synchronization header of the PPDU may include a SYNC field and a start-of-frame delimiter (SFD). The SFD field may be a field indicating the end of the SHR and the start of the data field.

Meanwhile, the PHY layer of the UWB device may include an optional mode to provide a reduced on-air time for high density/low power operation. In this case, the frame may include an encrypted sequence (i.e., STS) to increase the integrity and accuracy of the ranging measurement timestamp. The STS may be used for security ranging.

The structure of the PPDU (or frame) when the STS packet setting is applied (supported) may be as shown in FIG. 3B.

Referring to FIG. 3B, in the case of STS packet (SP) setting 0 (SP0), the STS field is not included in the PPDU (SP0 packet). In the case of SP setting 1 (SP1), the STS field is positioned immediately after the start of frame delimiter (SFD) field and before the PHR field (SP1 packet). In the case of SP setting 2 (SP2), the STS field is positioned after the PHY payload (SP2 packet). In the case of SP setting 3 (SP3), the STS field is positioned immediately after the SFD field, and the PPDU does not include the PHR and data field (PHY payload) (SP3 packet). In other words, in the case of SP3, the frame (or UWB message) does not include the PHR and PHY payload.

SP0, SP1 and SP3 may be settings that must be supported as mandatory when the STS packet setting is supported, and SP2 may be an optionally supported setting.

Figure 4:
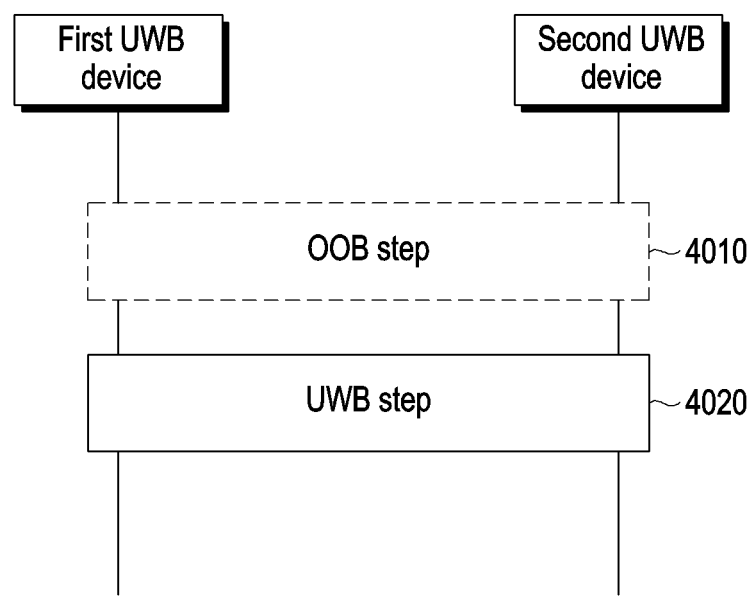
FIG. 4 illustrates a method for performing UWB communication by two UWB devices according to an embodiment of the disclosure.

FIG. 4 illustrates a method for performing UWB communication by two UWB devices according to an embodiment of the disclosure.

Referring to FIG. 4, a first UWB device may play a role as a controller (or controllee), and a second UWB device may play a role as a controllee (or controller), which is the role opposite to the role of the first UWB device. The first UWB device may play a role as an initiator (or responder), and the second UWB device may play a role as a responder (or initiator), which is the role opposite to the role of the first UWB device.

(1) Referring to FIG. 4, in operation 4010, the first UWB device and the second UWB device may optionally perform an OOB step (phase) before the UWB step (phase). In this disclosure, the OOB step may be referred to as an OOB connection step.

The OOB step may be a step performed to discover UWB devices through the OOB channel (e.g., a BLE channel) and to establish and control a UWB session.

In an embodiment of the disclosure, the OOB step may include at least one of the following steps.
- discovering UWB devices and profiles (device and profile discovery)
- establishing an OOB connection (channel)
- establishing a secure channel to secure messages and data
- exchanging parameters for establishing a UWB session through the secure channel (e.g., UWB capability parameters (controllee capability parameters), UWB configuration parameters and/or session key-related parameters) (parameter exchange step)

In an embodiment of the disclosure, the parameter exchange step may include the step for the controllee to transfer controllee capability parameters/messages (UWB_CAPABILITY) to the controller, the step for the controller to transfer UWB configuration parameters/messages (UWB_CONFIGURATION) to the controllee, and/or the step for one UWB device to transfer session key-related parameters/messages (SESSION_KEY_INFO) for protecting the UWB session to the other UWB device.

In an embodiment of the disclosure, the controllee (UWB) capability parameter and/or session key parameter may be included and transmitted in the controllee information message (CONTROLLEE_INFO) which is the OOB message transferred from the controllee to the controller. In an embodiment of the disclosure, the UWB configuration parameter and/or session key parameter may be included and transmitted in the session data message (SESSION_DATA) which is the OOB message transferred from the controller to the controllee.

The controllee performance parameter (UWB_CAPABILITY) may include at least one parameter that provides information about the device capability of the controllee. For example, the controller performance parameter may include a parameter for supporting the role of the device (initiator or responder), a parameter for multi-node support, a parameter for supporting STS configuration, a parameter for supporting a ranging method, a RFRAME feature performance parameter, a parameter for supporting angle of arrival (AoA), and/or a parameter for supporting scheduled mode.

The UWB configuration parameter (UWB_CONFIGURATION) may include at least one parameter used for configuration of a UWB session. For example, UWB configuration parameters may include a UWB session ID parameter, a ranging method parameter, a multi-node configuration parameter, an STS configuration parameter, a scheduled mode parameter, a time-of-flight (ToF) report parameter, an AoA-related parameter, a parameter indicating the number of slots per ranging round, a slot duration parameter, a responder slot index parameter, a MAC address mode parameter, a device MAC address parameter, a parameter indicating the number of controllees, and/or a destination (DST) MAC address parameter.

The session key-related parameter (SESSION_KEY_INFO) may include a session key-related parameter for dynamic STS and/or a session key-related parameter for Static STS. For example, the session key-related parameter for dynamic STS may include data exchanged to generate a UWB session key or data directly used as a UWB session key. For example, the static STS may include an ID (a vendor ID) of a vendor that is a provider of the UWB-enabled application and any pre-defined value (a static STS IV) selected by the UWB-enabled application for the UWB device. The vendor ID may be used to set the phyVupper64 parameter for static STS, and the static STS IV may be used to set the vUpper64 parameter.

(2) In operation 4020, the first UWB device and the second UWB device may perform a UWB step. In this disclosure, the UWB step may be referred to as an UWB connection step.

The UWB step may be a step which is performed to perform UWB ranging through the UWB session and transfer service data.

In an embodiment of the disclosure, the UWB step may include at least one of the following steps.
- Starting a UWB session (UWB Trigger)
- Performing UWB ranging to obtain the distance/location between two UWB devices
- Exchanging service data (transaction)

As described above, the OOB step is an optional step and may be omitted in some embodiments. For example, when discovery of a UWB device and/or establishment and control of a UWB session are performed through a UWB channel (in-band), the OOB step may be omitted. For example, when in-band discovery is performed, the OOB step of performing OOB discovery may be omitted. In this case, the UWB step may further perform an operation for discovering a UWB device through the UWB channel and exchanging parameters for UWB session configuration.

Figure 5A:
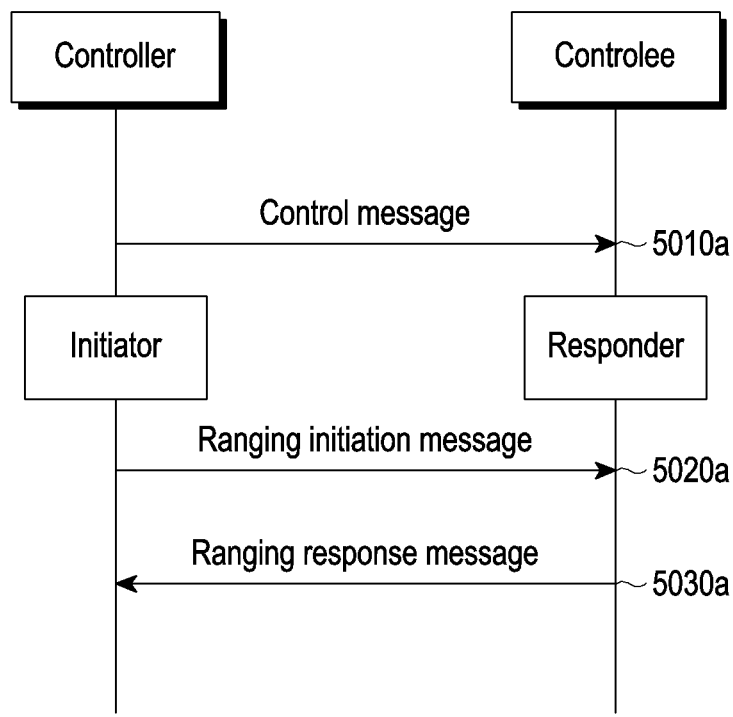
FIGS. 5A and 5B illustrate a method for performing UWB ranging by two UWB devices according to various embodiments of the disclosure.
Figure 5B:
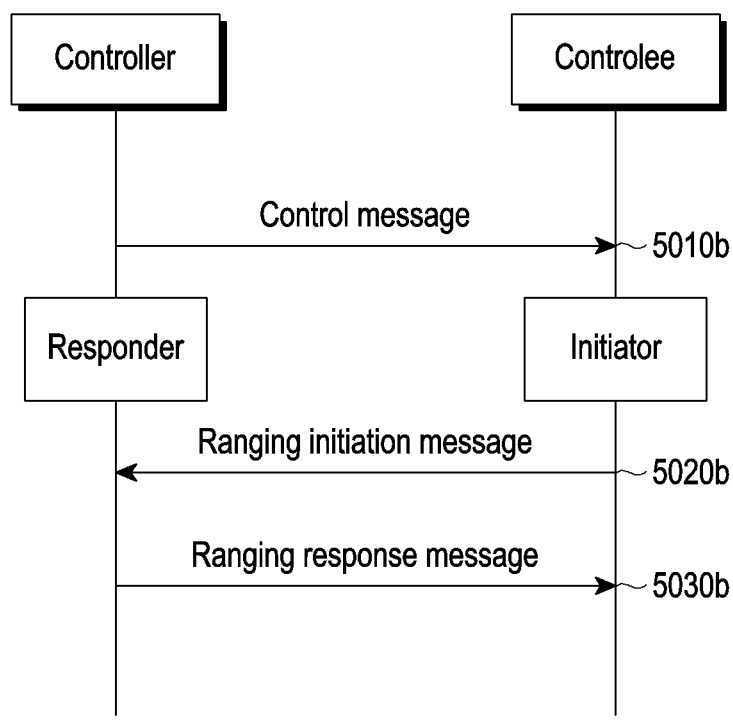

FIGS. 5A and 5B illustrate a method for performing UWB ranging by two UWB devices according to various embodiments of the disclosure.

FIG. 5A illustrates an embodiment in which the first UWB device operates as the controller/initiator, and the second UWB device operates as the controllee/responder. FIG. 5B illustrates an embodiment in which the first UWB device operates as the controller/responder, and the second UWB device operates as the controllee/initiator.

Referring to FIGS. 5A and 5B, in operations 5010a, and 5010b, the controller may transmit a control message for UWB ranging to the controllee. The ranging control message may be used to carry ranging parameter(s) for controlling and configuring a ranging procedure. In an embodiment of the disclosure, the control message may include information about the role (e.g., an initiator or a responder) of the ranging device, ranging slot index information, and/or address information about the ranging device.

In operations 5020a and 5020b, the initiator may transmit a ranging Initiation message for initiating UWB ranging to the responder. In an embodiment of the disclosure, the initiators may transmit a ranging initiation message through an SP1 packet or an SP3 packet. When the ranging initiation message is transmitted through the SP1 packet, the control message may be included and transmitted in the PHY payload of the ranging initiation message. When the ranging initiation message is transmitted through the SP3 packet, the ranging initiation message does not include the PHR and PHY payloads.

In operations 5030*a* and 5030*b*, the responder may transmit a ranging reply message to the initiator in response to the ranging initiation message. In an embodiment of the disclosure, the responders may transmit a ranging reply message through an SP1 packet or an SP3 packet. When the ranging reply message is transmitted through the SP1 packet, a first measurement report message may be included and transmitted in the PHY payload of the ranging reply message. In an embodiment of the disclosure, the first measurement report message may include an AoA measurement, a reply time measured by the responder and/or a list of round-trip time measurements for responders and responder addresses. The reply time field may indicate a time difference between the reception time of the ranging initiation message and the transmission time of the ranging reply message at the responder side. Based on this, single-sided two-way ranging (SS-TWR) may be performed. ToF calculation through SS-TWR follows the scheme defined in IEEE 802.15.4z.

In the case of double-sided two-way ranging (DS-TWR), the initiators may further transmit a ranging final message to the responders to complete the ranging exchange. When the ranging final message is transmitted through the SP1 packet, a second measurement report message may be included and transmitted in the PHY payload of the ranging final message. In an embodiment of the disclosure, the second measurement report message may include an AoA measurement, the round-trip time for the first responder (first round-trip time) and/or a list of reply time measurements for responders and responder addresses. When the sender of the measurement report message is the initiator, the first round-trip time field may indicate a time difference between the ranging initiation message from the initiator and the first ranging reply message from the first responder. Alternatively, when the sender of the measurement report message is the responder, the first round-trip time field may indicate a time difference between the ranging reply message from the responder and the ranging final message from the initiator. Based on this, DS-TWR may be performed. Time-of-flight (ToF) calculation through DS-TWR follows the scheme defined in IEEE 802.15.4z.

According to an embodiment of the disclosure, the above-described first measurement report message and/or second measurement report message may not be included in the ranging reply message and/or the ranging final message but may be transmitted as separate messages. For example, when the non-deferred mode is applied, the measurement report message may be transmitted through the data frame after the ranging exchange.

Meanwhile, the initiator and responder may perform UWB ranging according to a preset schedule mode. For example, in the time-scheduled ranging mode, the controller may know the IDs of all controllees and may designate an accurate schedule of ranging transmission. As another example, in the contention-based ranging mode, the controller does not know the number and ID of the controllees, and thus UWB devices compete with each other. In this case, a collision may occur between the responding devices.

Figure 6:
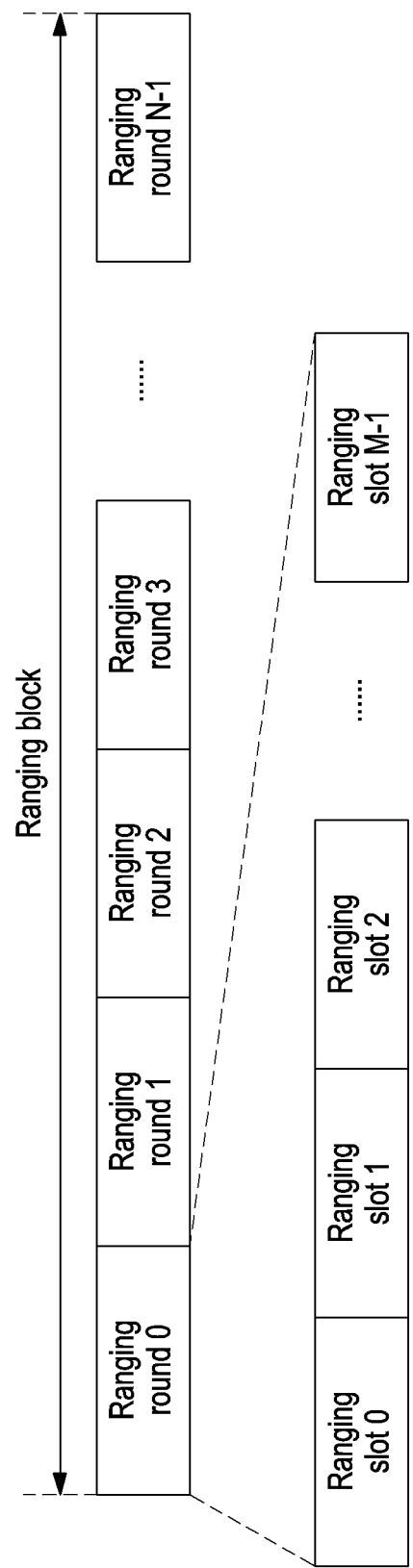
FIG. 6 illustrates a structure of a ranging block and a round used for UWB ranging according to an embodiment of the disclosure.

FIG. 6 illustrates a structure of a ranging block and a round used for UWB ranging according to an embodiment of the disclosure.

In this disclosure, the ranging block refers to a time period for ranging. The ranging round may be a period of sufficient duration to complete one entire range-measurement cycle in which a set of UWB devices participating in a ranging exchange involves. The ranging slot may be a sufficient period for transmission of at least one ranging frame (RFRAME) (e.g., ranging initiation/reply/final message, or the like).

Referring to FIG. 6, one ranging block may include at least one ranging round. Each ranging round may include at least one ranging slot.

When the ranging mode is a block-based mode, a mean time between contiguous ranging rounds may be a constant. Alternatively, when the ranging mode is an interval-based mode, the time between contiguous ranging rounds may be dynamically changed. In other words, the interval-based mode may adopt a time structure having an adaptive spacing.

The number and duration of slots included in the ranging round may be changed between ranging rounds. This may be configured through a control message from the controller.

The UWB protocol is applicable to a use case for handling multiple users and providing fast authentication or payment. For example, the UWB protocol is applicable to a gate service in which users having a UWB device (e.g., a smartphone) may process authentication or payment without interaction on the UWB device to pass a UWB-based gate system.

The disclosure proposes an example system architecture, example OOB procedure (e.g., a BLE procedure), ranging procedure, and transaction procedure for providing a UWB service for multiple users, e.g., the gate system.

The disclosure also proposes a method for operating a plurality of UWB channels to reduce service delay.

The following description of embodiments focuses primarily on the gate service (smart gate service). However, this is merely an example. Embodiments of the disclosure are also applicable to various types of services (e.g., a PoS payment service) requiring fast authentication or payment processing for multiple users. In this case, what has been described above in connection with FIGS. 1, 2, 3A, 3B, 4, 5, and 6 may be referenced for the example system architecture, example OOB procedure (e.g., a BLE procedure), ranging procedure, and transaction procedure for providing the service.

Figure 7:
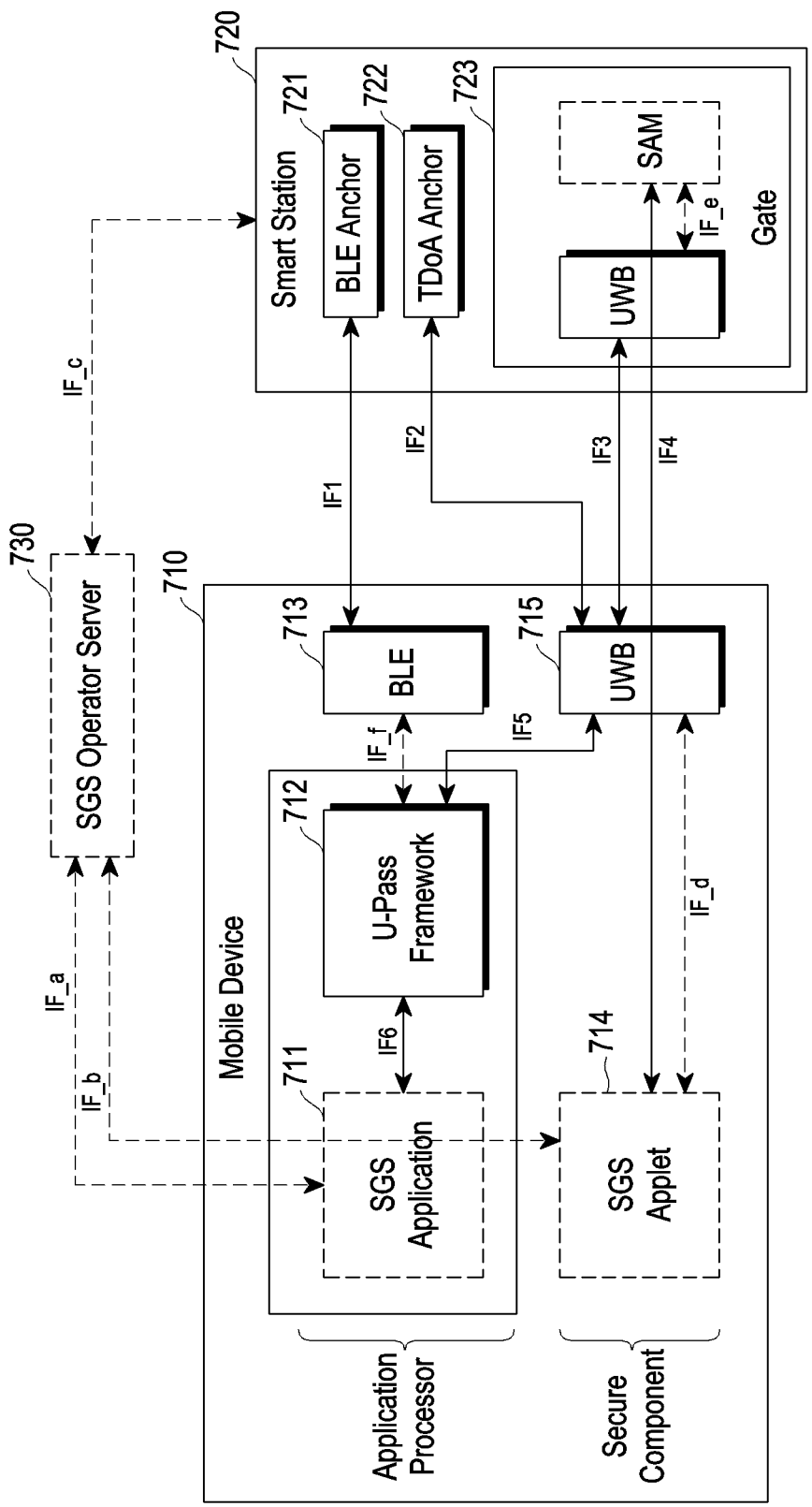
FIG. 7 illustrates an architecture of a system of providing a UWB-based gate service according to an embodiment of the disclosure.

FIG. 7 illustrates an architecture of a system of providing a UWB-based gate service according to an embodiment of the disclosure.

In an embodiment of the disclosure, the UWB-based gate service may be referred to as a gate service or a smart gate service (SGS), and the system that provides a UWB-based gate service may be referred to as a gate system or a smart gate system.

Referring to FIG. 7, the gate system may include a mobile device 710, a smart station 720 and/or an SGS operator server 730. In this disclosure, the mobile device 710 may be referred to as a first UWB device, and the smart station 720 may be referred to as a second UWB device.

(1) The mobile device 710 may include an SGS application 711, a framework (U-Pass framework) 712, a BLE component (subsystem) 713, an SGS applet 714, and/or a UWB component (subsystem) 715. In an embodiment of the disclosure, the framework, the SGS application 711, the SGS applet 714, the BLE component 713, and/or the UWB component 715 of the mobile device may be examples of the framework, UWB-enabled application, applet, OOB component, and UWB component, respectively, of the UWB device 100 described above in connection with, e.g., FIG. 1.

The framework 712 may support at least one of the following functions.

Estimate the location of the mobile device during the downlink-TDoA (D-TDoA) round Implement procedures for performing UWB ranging and transaction Provide a set of APIs for the SGS operator's application (SGS application) and provide an interface between the framework and UWB components.

Trigger UWB communication (component) when BLE advertisement is received from smart station.

The SGS application 711 may support at least one of the following functions.

When requested by the framework, provide anchor and UWB block structure deployment information Provide the framework with the AID of SGS applets and the version of the SGS applet protocol Communication with the SGS operator server to initiate service application installation, station specific information retrieval (e.g., an anchor map), and token retrieval or renewal process The SGS applet 714 may support at least one of the following functions.

Hosted on a secure component (e.g., SE or TEE) capable of communicating through a UWB interface.

Implement transaction protocol for gate service

Support APDU command

The BLE component 713 may be used to receive at least one BLE message from the smart station when the mobile device enters the service area of the gate system.

The UWB component 715 may be used to estimate the location of the mobile device, e.g., by D-TDoA, and/or may be used to communicate with a specific gate to perform UWB ranging and transactions.

(2) The smart station 720 may include at least one BLE anchor 721, at least one TDoA anchor 722, and/or at least one gate (gate device) 723. In this disclosure, the TDoA anchor may be a D-TDoA anchor or uplink-TDoA (U-TDoA) anchor.

The BLE anchor 721 may be used to provide general station information about the mobile device and to inform that the mobile devices are entering the service area of the gate system.

In an embodiment of the disclosure, the BLE anchor 721 may support a role as a GAP broadcaster, a role as a GATT server, and/or broadcasting of the advertising physical channel PDU.

The TDoA anchor 722 may be deployed in the service area of the gate system. The D-TDoA anchor 722 may broadcast a UWB message at a specific time. This UWB message may be used by the mobile device to estimate its location.

The gate device 723 may include at least one UWB component (subsystem) and/or a security authentication module. The UWB component may be an example of the UWB subsystem described above in connection with FIG. 1 and the like. In an embodiment of the disclosure, the gate arrangement may include at least one anchor, and each anchor may include at least one UWB component.

The UWB component may be used to communicate with the mobile device for gate access and gate ranging, so as to identify whether the mobile device is within a valid range to perform the transaction procedure and pass through the gate.

In an embodiment of the disclosure, the UWB component may support at least one of the following features.

Perform DS-TWR

Perform gate connection and gate ranging

Provide an interface to the security authentication module

The security authentication module may be used to verify whether the mobile device is authenticated to use the gate system.

In an embodiment of the disclosure, the security authentication module may support at least one of the following features.

Provides an interface to the UWB component

Capability of communication through UWB interface

Capability for synchronization with the SGS operator server (3) The SGS operator 730 server may manage the entire gate system. To this end, the SGS operator server 730 may communicate with the mobile device and smart station.

Figure 8:
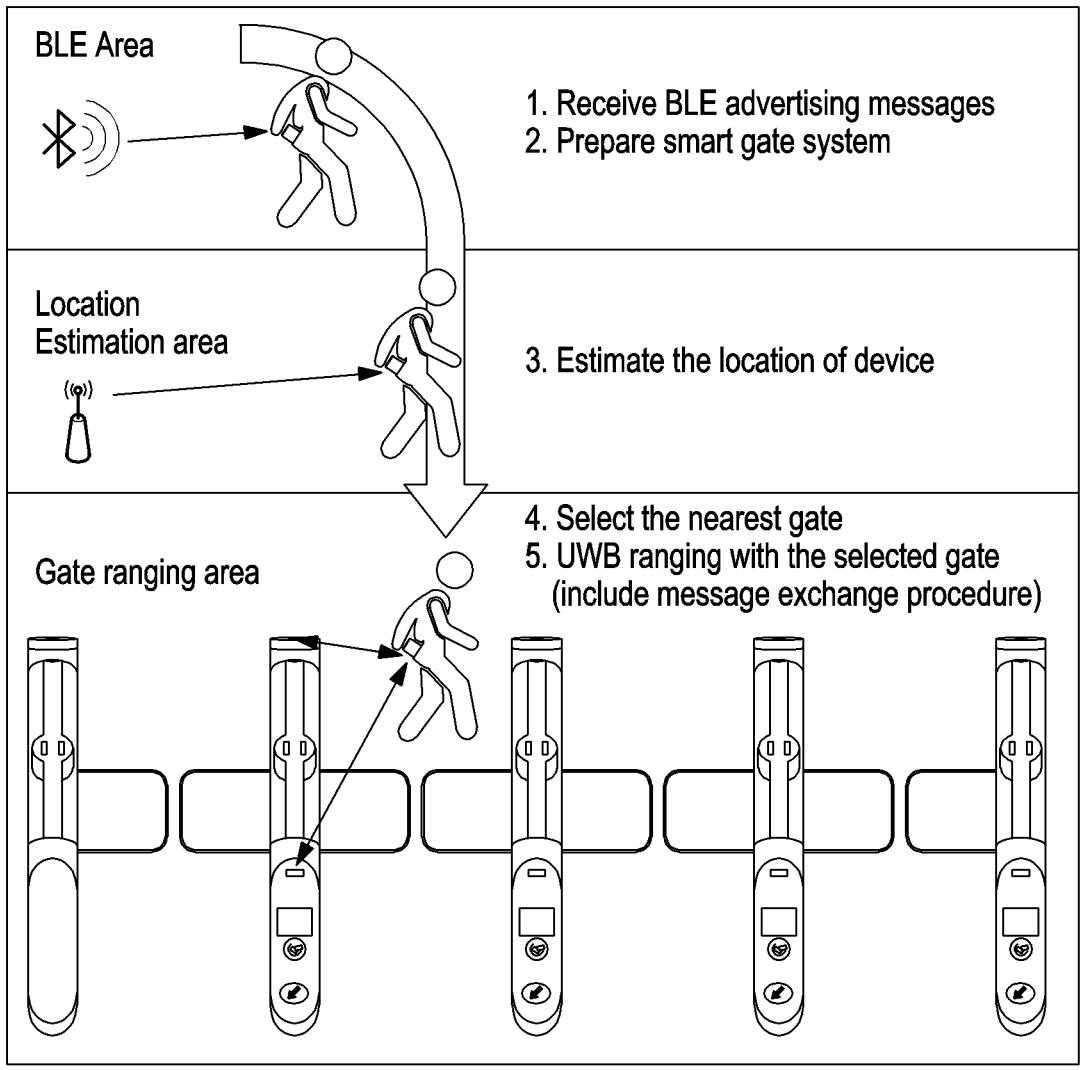
FIG. 8 illustrates an operation scenario of a gate system according to an embodiment of the disclosure.

FIG. 8 illustrates an operation scenario of a gate system according to an embodiment of the disclosure.

The gate system of FIG. 8 may be the gate system of FIG. 7.

Referring to FIG. 8, in operation 1, when the mobile device (or the user carrying the mobile device) enters the BLE area of the gate system, the mobile device may receive a BLE advertisement message (packet) from at least one BLE anchor of the smart station. The at least one BLE anchor may be located in the BLE area.

In operation 2, upon receiving the BLE advertisement message, a prerequisite procedure for the gate system may be performed. In other words, the gate system may be prepared. In an embodiment of the disclosure, the prerequisite procedure may be activated by the UWB component of the mobile device and be used to obtain authentication-related information and/or UWB-related information from the SGS operator server.

In operation 3, when the mobile device enters a location estimation area, the mobile device may estimate its location to determine the nearest gate which it is to pass. In an embodiment of the disclosure, the mobile device may receive a TDoA message from at least one TDoA anchor of the smart station and estimate its location using a D-TDoA scheme. The application (e.g., an SGS application) of the mobile device may provide or use the locations of gate(s).

In operation 4, the mobile device may select the nearest gate. In an embodiment of the disclosure, the mobile device may select the nearest gate based on the result of estimation of the location of the mobile device and the location of the gate(s).

In operation 5, the mobile device may perform a procedure for UWB ranging with the selected gate. After selecting the nearest gate, the mobile device may participate in contention in a specific slot to perform UWB ranging with the gate. Slots (contention period) possible for participating in contention may be known through a UWB message by the gate. If the mobile device obtains a chance for transmittance, UWB ranging and service protocol (transaction) may be performed with the gate. After proper authentication or payment capability is verified through exchange of messages and UWB ranging, the user may pass the gate.

Figure 9:
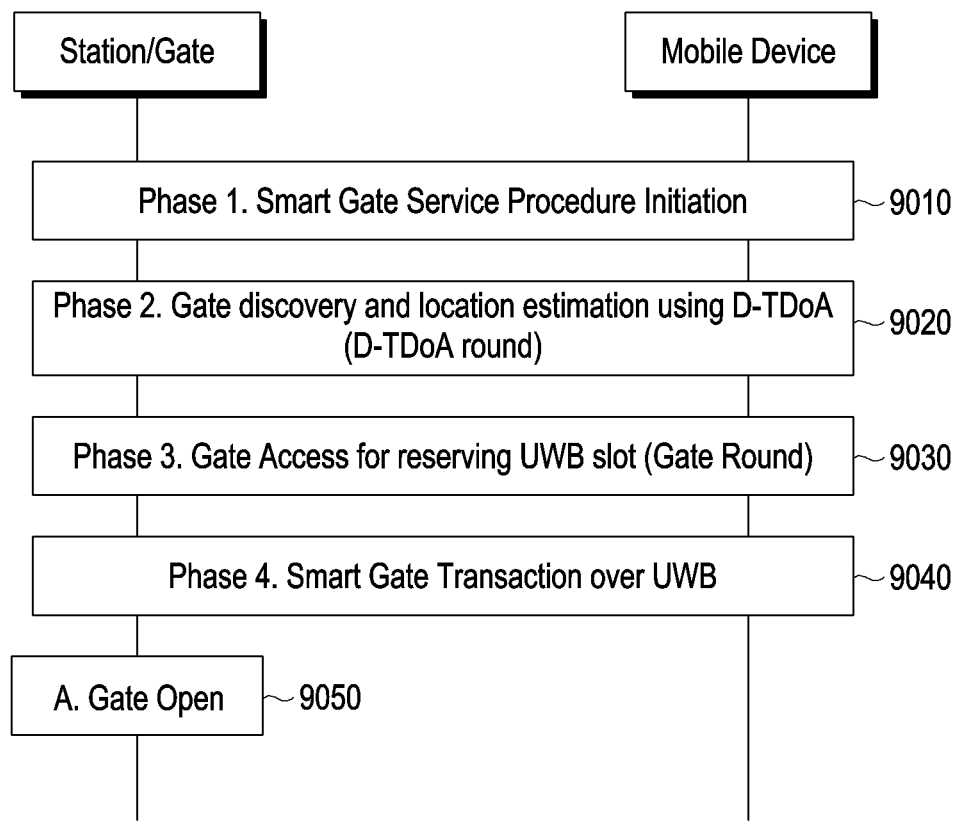
FIG. 9 illustrates a smart gate service procedure of a gate system according to an embodiment of the disclosure.

FIG. 9 illustrates a smart gate service procedure of a gate system according to an embodiment of the disclosure.

The gate system of FIG. 9 may be the gate system of FIG. 7.

Referring to FIG. 9, a smart gate service procedure may be performed between a smart station including at least one gate device and at least one mobile device.

The smart gate service procedure may include a smart gate service initiation phase (phase 1) 9010, a gate discovery and location estimation phase using D-TDoA (phase 2) 9020, a gate access phase for UWB slot reservation (phase 3) 9030, and/or a transaction phase through UWB (phase 4)

9040. If the transaction (transaction phase) according to the smart gate service procedure is complete, a specific gate may be open 9050. Thus, the user may enter or exit the specific gate.

In an embodiment of the disclosure, the smart gate service initiation phase 9010 may include, e.g., operations 1 and 2 of FIG. 8.

In an embodiment of the disclosure, the gate discovery and location estimation phase 9020 may include, e.g., operation 3 of FIG. 8.

In an embodiment of the disclosure, the gate access phase for UWB slot reservation 9030 may include, e.g., the access operation (participation in contention) of operations 4 and 5 of FIG. 8. During the gate access phase (procedure) 9030, the mobile device may participate in contention to occupy a slot for data communication. If the mobile device obtains a specific slot, the gate and the mobile device may exchange data for the service protocol.

In an embodiment of the disclosure, the transaction phase through UWB 9040 may include, e.g., the UWB ranging and service protocol (transaction) operation of operation 5 of FIG. 8. In an embodiment of the disclosure, the service protocol may need a plurality of, e.g., ranging blocks to complete the message exchange procedure. For example, to complete the message exchange procedure for each gate, a plurality of ranging rounds may be needed and, since one round for the corresponding gate may be allocated to one block, the service protocol may require a plurality of blocks to complete the message exchange procedure.

Figure 10:
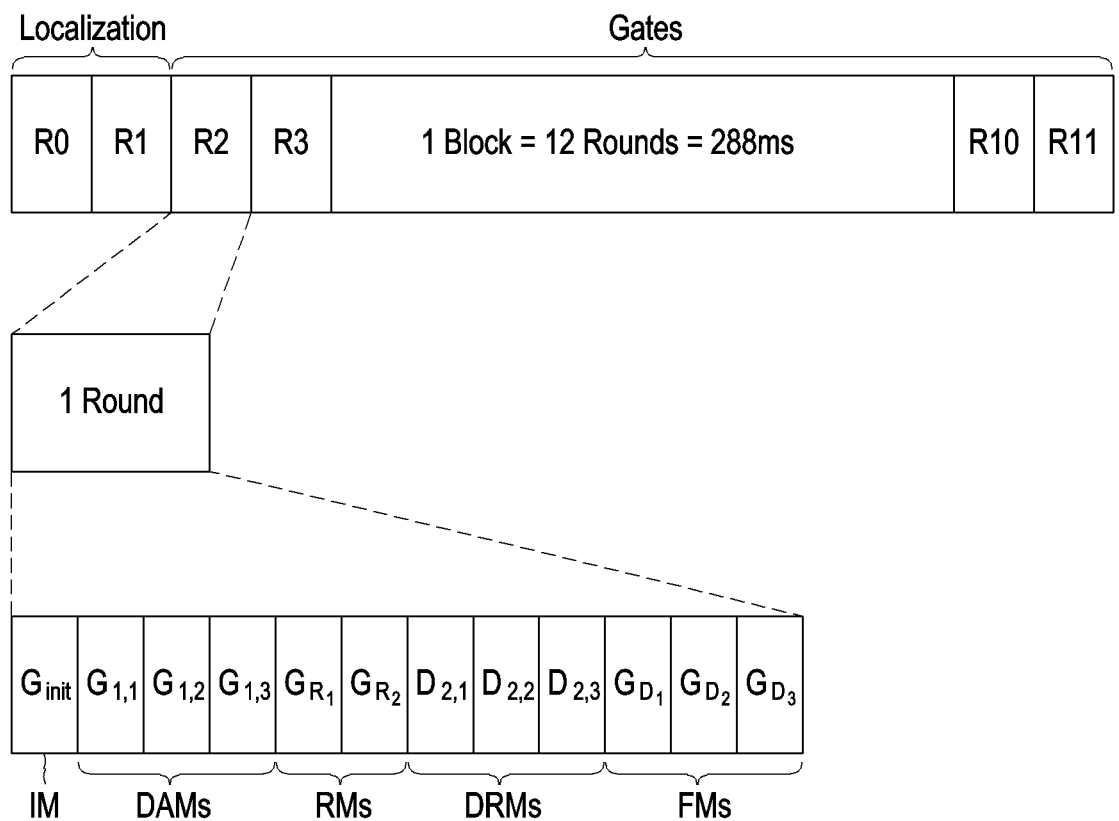
FIG. 10 illustrates a structure of a ranging block used for a smart gate service according to an embodiment of the disclosure.

FIG. 10 illustrates a structure of a ranging block used for a smart gate service according to an embodiment of the disclosure.

The ranging block of FIG. 10 may be an example of the ranging block of FIG. 6.

Referring to FIG. 10, the ranging block includes a plurality of ranging rounds. In an embodiment of the disclosure, the ranging block may include at least one ranging round for location estimation (localization) and at least one ranging round for at least one gate. In this disclosure, the round for location estimation may be referred to as a D-TDoA round, and the round for the gate may be referred to as a gate round.

In an embodiment of the disclosure, one gate round may be allocated for each gate. For example, as illustrated, when the smart station includes 12 gates, the ranging block may include 12 gate rounds.

In an embodiment of the disclosure, the gate round includes a plurality of ranging slots. As many ranging slots as needed for multiple access to the corresponding gate, UWB ranging, and/or transaction may be allocated, and the number of slots may be nearly fixed. For example, as illustrated, there may be allocated as many slots as needed for the period for the initiation message (IM), the period for the device access message (DAM) corresponding to the initiation message, the period for the reply message (RM) corresponding to the device access message, the period for the device reply message (DRM) corresponding to the reply message, and/or the period for the final message FM. In an embodiment of the disclosure, IM, RM, and FM may be messages transmitted by an initiator (e.g., a smart station or a gate device of a smart station), and DAM and DRM may be messages transmitted by a responder (e.g., a mobile device).

When the number of gates increases so that the length of the ranging block increases, the period of location estimation and gate service increases, which may cause service delay. Therefore, it is necessary to consider a method to address the issue.

The disclosure proposes a method for operating a plurality of UWB channels to address a service delay caused by an increase in ranging block length according to the number of gates. Also proposed is a method for appropriately selecting one channel from among a plurality of UWB channels supported according to the context of the mobile device.

Figure 11:
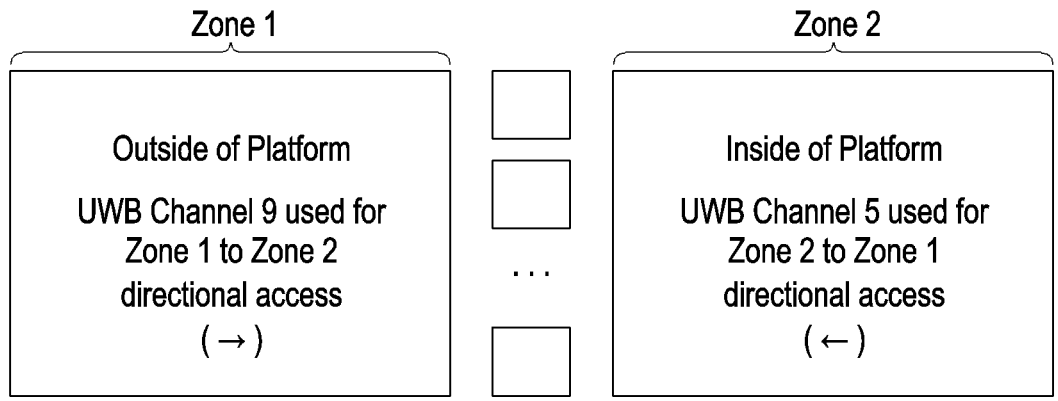
FIG. 11 illustrates a method for operating a plurality of UWB channels in a gate system according to an embodiment of the disclosure.

FIG. 11 illustrates a method for operating a plurality of UWB channels in a UWB system according to an embodiment of the disclosure.

Referring to FIG. 11, the UWB system may be the gate system of FIG. 7 or the UWB system of FIG. 2. In the embodiment of FIG. 11, the mobile device may be referred to as a first UWB device, and the smart station may be referred to as a second UWB device.

A plurality of channels predetermined for UWB communication may be used. For example, channel 5 (6489.6 megahertz (MHz)), channel 6 (6988.8 MHz), channel 8 (7488.0 MHz), and channel 9 (7987.2 MHz) may be used for UWB communication. The gate system may use some or all of the plurality of available channels.

Referring to FIG. 11, the service area of the gate system may be divided into an inside area (e.g., an inside (zone 2) of the platform) and an outside area (e.g., an outside (zone 1) of the platform) with respect to the gate. In this case, the gate system may use different UWB channels in the inside area and the outside area. For example, UWB channel 5 may be used in the inside area, and UWB channel 9 may be used in the outside area. The area (zone) may be subdivided according to an embodiment.

The mobile device should select an appropriate UWB channel to be used. In an embodiment of the disclosure, the mobile device may select the UWB channel to be used upon UWB activation for location estimation (localization).

In an embodiment of the disclosure, the mobile device may select the UWB channel to be used and whether the plurality of UWB channels are operated, based on the BLE advertisement message transmitted from at least one BLE anchor of the smart station.

In an embodiment of the disclosure, when a plurality of UWB channels are operated, the mobile device may identify whether the mobile device is located in the inside area or outside area of the gate according to a predetermined scheme and select a UWB channel to be used based on a result of the identification.

In an embodiment of the disclosure, upon receiving the BLE advertisement message, the mobile device may identify whether the mobile device is located in the inside area or outside area of the gate based on a result of the transaction for the gate service. Specifically, as described in connection with FIG. 9, if a transaction is complete on a specific gate, the gate may be open so that the mobile device may enter or exit the gate. Accordingly, whether the transaction is complete may be used as indirect information for identifying entry and exit to/from the gate. The transaction (transaction phase) may be performed by the SGS applet of the mobile device, and the framework may be notified of the completion of the transaction. Accordingly, the framework may update the information about whether the mobile device is located inside or outside the gate whenever the mobile device enters or exits. Thus, the mobile device (or framework) may identify whether the mobile device is located in the outside or inside area of the gate, using the updated information.

Figure 12:
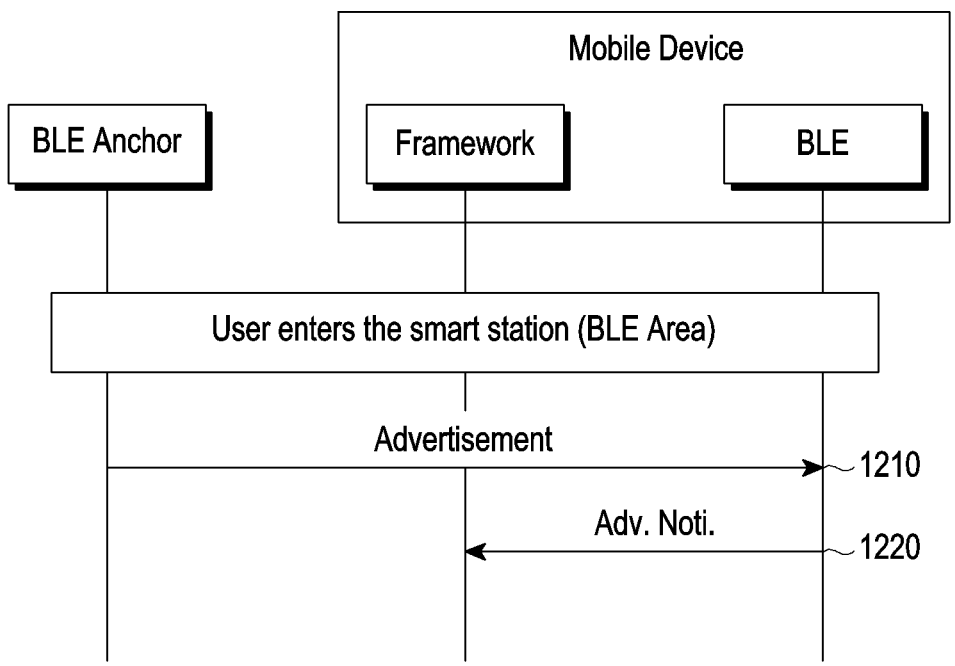
FIG. 12 illustrates a method for indicating operation of a plurality of UWB channels using a Bluetooth low energy (BLE) advertisement message in a gate system according to an embodiment of the disclosure.

FIG. 12 illustrates a method for indicating operation of a plurality of UWB channels using a BLE advertisement message in a UWB system according to an embodiment of the disclosure.

Referring to FIG. 12, the UWB system may be the gate system of FIG. 7 or the UWB system of FIG. 2. In the embodiment of FIG. 12, the mobile device may be referred to as a first UWB device, and the smart station may be referred to as a second UWB device.

The embodiment of FIG. 12 may be an embodiment in which at least one BLE anchor of the smart station notifies the mobile device of operation of a plurality of UWB channels, using a BLE advertisement message (packet).

The embodiment of FIG. 12 may be an embodiment applied when the user (or the user's mobile device) enters the BLE area as illustrated.

Referring to FIG. 12, in operation 1210, at least one BLE anchor of the smart station may broadcast the BLE advertisement message. In an embodiment of the disclosure, the BLE anchor may periodically broadcast the BLE advertisement message. In this case, the mobile device may receive the BLE advertisement message through the BLE component (sub system).

In an embodiment of the disclosure, the BLE advertisement message may include information about the UWB channel (UWB channel information). In an embodiment of the disclosure, the BLE anchor may transmit the information about the UWB channel used in the area where the BLE anchor is located, through the BLE advertisement message.

In an embodiment of the disclosure, the UWB channel information may be used for the BLE anchor (or smart station) to notify the mobile device whether a plurality of UWB channels are operated for the gate service. The UWB channel information may be used to inform the mobile device of the channel corresponding to a specific area when a plurality of UWB channels are operated.

In an embodiment of the disclosure, the UWB channel information may include information indicating the area (zone) (indication information) and/or information about the channel (channel number) corresponding to the indicated area (channel information). In an embodiment of the disclosure, the indication information may also be referred to as flag information and the channel information may also be referred to as channel number information.

For example, the UWB channel information may include indication information indicating a first area (zone 1) or a second area (zone 2) and channel information indicating the channel number corresponding to the area (e.g., the first area or second area) indicated by the indication information. The first area may be the inside area of the gate, and the second area may be the outside area of the gate. The opposite may also be met. The area (zone) may be subdivided according to an embodiment.

In an embodiment of the disclosure, the mobile device may identify whether a plurality of UWB channels are operated for the gate service based on information included in the BLE advertisement message.

First Embodiment

In the first embodiment of the disclosure, the mobile device may identify whether a plurality of UWB channels are operated based on the value of indication information included in the UWB channel information.

For example, when the value of the indication information is set to a value indicating a specific area (e.g., the first value indicating zone 1 or the second value indicating zone 2), the mobile device may identify that a plurality of UWB channels are operated. Alternatively, when the value of the indication information is not set to a value indicating a specific area, the mobile device may identify that a plurality of UWB channels are not operated. Alternatively, when the value of the indication information is set to a value indicating that only one UWB channel is used, the mobile device may identify that a plurality of UWB channels are not operated.

In the first embodiment of the disclosure, the indication information is used to indicate a specific area and may also be used to indicate whether a plurality of UWB channels are operated.

Second Embodiment

In the second embodiment of the disclosure, the mobile device may identify whether a plurality of UWB channels are operated based on a value of a separate additional flag.

In an embodiment of the disclosure, the additional flag may be, e.g., a 1-bit flag, and may explicitly indicate whether a plurality of UWB channels are operated. For example, an additional flag set to a first value (e.g., 1) may indicate that a plurality of UWB channels are operated, and an additional flag set to a second value (e.g., 0) may indicate that only one UWB channel is operated. In this case, the mobile device may identify whether a plurality of UWB channels are operated based on a value of an additional flag. In the second embodiment of the disclosure, the indication information may be used only to indicate a specific area.

In an embodiment of the disclosure, the additional flag may be included in the UWB channel information. However, without limited thereto, according to an embodiment of the disclosure, an additional flag may be included in the BLE advertisement message separately from the UWB channel information.

The above-described first embodiment may indicate whether a plurality of UWB channels are operated, as well as indicate a specific area, only with one piece of indication information and may thus more efficiently use the resources of the BLE advertisement message as compared with the second embodiment which requires a separate additional flag.

In operation 1220, the BLE component of the mobile device may transfer the received BLE advertisement message or the data in the BLE advertisement message to the framework (U-Pass framework) (Adv. Noti.). Upon receiving the BLE advertisement message (or data), the framework (or mobile device) may perform a predetermined preparation procedure for a smart gate service based on the information included in the BLE advertisement message.

For example, the framework may identify whether a plurality of UWB channels are operated for the gate service, based on the information (e.g., UWB channel information) included in the BLE advertisement message. This may follow the operations of the first and second embodiments described above.

When it is identified that a plurality of UWB channels are operated, the framework may select a UWB channel to be used from among the plurality of UWB channels based on the UWB channel information.

Alternatively, when it is identified that a plurality of UWB channels are not operated (i.e., when only one UWB channel is used), the framework may identify the corresponding UWB channel. In an embodiment of the disclosure, the single UWB channel may be a default UWB channel previously known to the mobile device or a UWB channel indicated by channel information included in UWB channel information.

Figure 13:
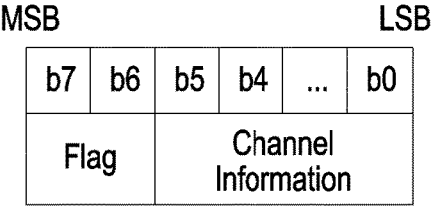
FIG. 13 illustrates a BLE advertisement message including UWB channel information according to an embodiment of the disclosure.

FIG. 13 illustrates a BLE advertisement message including UWB channel information according to an embodiment of the disclosure.

Referring to FIG. 13, a BLE advertisement message (packet) may include UWB channel information. In an embodiment of the disclosure, the UWB channel information may include flag information (flag) and channel information.

In an embodiment of the disclosure, the flag information may precede the channel information. As illustrated, the UWB channel information may be 1-byte long, and the most significant bit (MSB) 2 bits may be allocated for flag information, and the least significant bit (LSB) 6 bits may be allocated for channel information. As described above, in the UWB channel information according to the disclosure, the flag information indicating a specific area which is to be indicated by the channel information precedes the channel information, thereby enabling faster and more efficient processing.

In an embodiment of the disclosure, the flag information may indicate a specific area (zone) or indicate that only one UWB channel is used.

For example, as illustrated, the flag information may be, e.g., a 2-bit flag and may be set to a first value (e.g., 10) to indicate the first area (zone 1), a second value (e.g., 01) to indicate the second area (zone 2), or a third value (e.g., 00) to indicate that only one UWB channel is used. When the flag information is set to the first value or the second value (or a value other than the third value), it may be implicitly signaled that a plurality of UWB channels are operated. When the flag information is set to the third value, it may be explicitly signaled that only one UWB channel is operated (used).

According to the embodiment of FIG. 13, it is possible to signal whether one or more UWB channels are used, as well as to indicate a specific area (zone), through one piece of flag information, thereby enabling efficient use of the resources of the BLE advertisement message.

In an embodiment of the disclosure, the channel information may indicate the UWB channel (UWB channel number) for the indicated area (zone). As described above, the indication of the area may be performed by the flag information preceding the channel information.

For example, as illustrated, the channel information may be 6-bit information and may be set to a value indicating the UWB channel number for the indicated area. For example, the channel information set to 5 may indicate that the UWB channel number for the indicated area is 5.

In an embodiment of the disclosure, the UWB channel information may be included in, e.g., BLE ADV_IND advertisement message among BLE advertisement messages. For example, as illustrated, the UWB channel information may be included in the AdvData field included in the payload of the BLE ADV_IND advertisement message. In an embodiment of the disclosure, the AdvData field may include at least one advertising date (AD) fields (data structures), and the AD field may include a length field indicating the length of the AD type parameter, an AD type parameter indicating the type of the AD Data, and/or an AD Date parameter including the AD Date.

In an embodiment of the disclosure, the AdvData field (or BLE ADV_IND advertisement message) may include an AD field for service data. In this case, as illustrated, UWB channel information may be included in the AD field for service data. In an embodiment of the disclosure, the AD field for service data may include an AD Data parameter indicating the UUID of the service protocol, an AD Data parameter indicating the service protocol version of the gate, an AD Data parameter indicating the session ID, and/or an AD Data parameter including additional data for the service protocol. In an embodiment of the disclosure, the service protocol version of the gate may be the same as the highest version of the transaction supported by the smart station (smart gate transaction).

In an embodiment of the disclosure, the AdvData field (or the BLE ADV_IND advertisement message) may further include an AD field for a service UUID. In an embodiment of the disclosure, the AD field for the service UUID may include an AD Data parameter including the UUID of the smart gate system.

Figure 14:
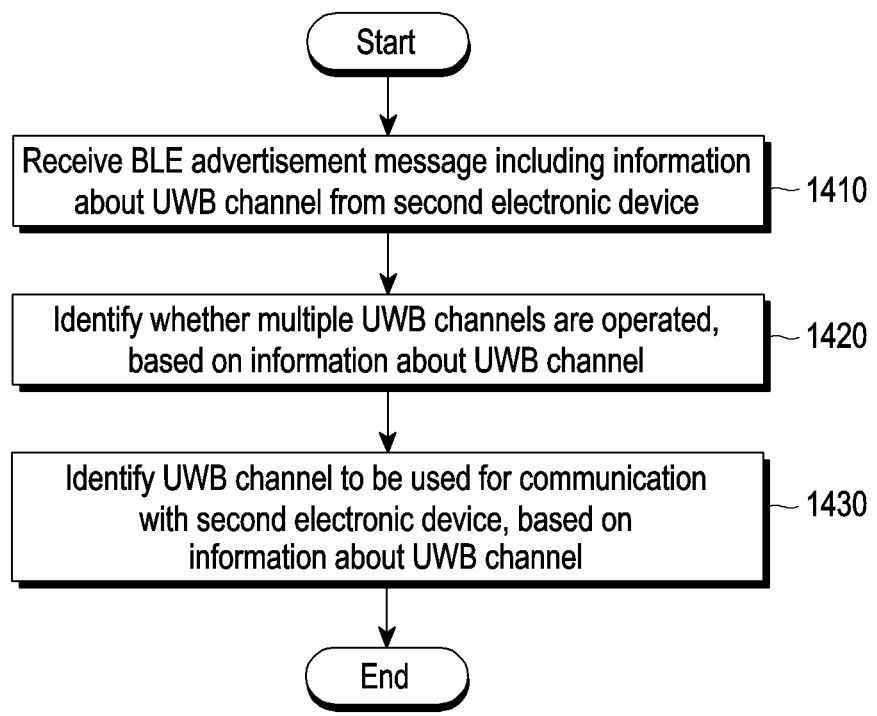
FIG. 14 is a flowchart illustrating a method by a first electronic device according to an embodiment of the disclosure.

FIG. 14 is a flowchart illustrating a method by a first electronic device according to an embodiment of the disclosure.

Referring to FIG. 14, the first electronic device may be, e.g., the UWB device of FIGS. 1 and 2 or the mobile device of FIG. 7, and the second electronic device may be, e.g., the UWB device of FIGS. 1 and 2 or the smart device of FIG. 7 or the BLE anchor of the smart station or the gate device of the smart station. In relation to FIG. 14, no duplicate description is given of those described above in connection with FIGS. 1, 2, 3A, 3B, 4, 5A, 5B, 6, 7, 8, 9, 10, 11, 12, and 13.

The first electronic device may receive a BLE advertisement message including information about the UWB channel from the second electronic device in operation 1410. This may reference the description made in connection with FIGS. 12 and 13.

In operation 1420, the first electronic device may identify whether a plurality of UWB channels are operated based on the information about the UWB channel. This may reference the description made in connection with FIGS. 12 and 13.

The first electronic device may identify the UWB channel to be used for communication with the second electronic device, based on the information about the UWB channel in operation 1430. This may reference the description made in connection with FIGS. 12 and 13.

In an embodiment of the disclosure, the information about the UWB channel (UWB channel information) may include the flag information indicating the area and the channel information indicating the UWB channel for the indicated area.

In an embodiment of the disclosure, the flag information may be set to one of the first value indicating the first area, the second value indicating the second area, or the third value indicating that only one UWB channel is used.

In an embodiment of the disclosure, identifying whether a plurality of UWB channels are operated may identify that a plurality of UWB channels are operated when the flag information is set to the first value or the second value and identify that only one UWB channel is used when the flag information is set to the third value.

In an embodiment of the disclosure, the flag information may precede the channel information.

In an embodiment of the disclosure, the information about the UWB channel may be one-byte long, and the flag information may have a length of MSB 2 bits, and the channel information may have a length of LSB 6 bits.

Figure 15:
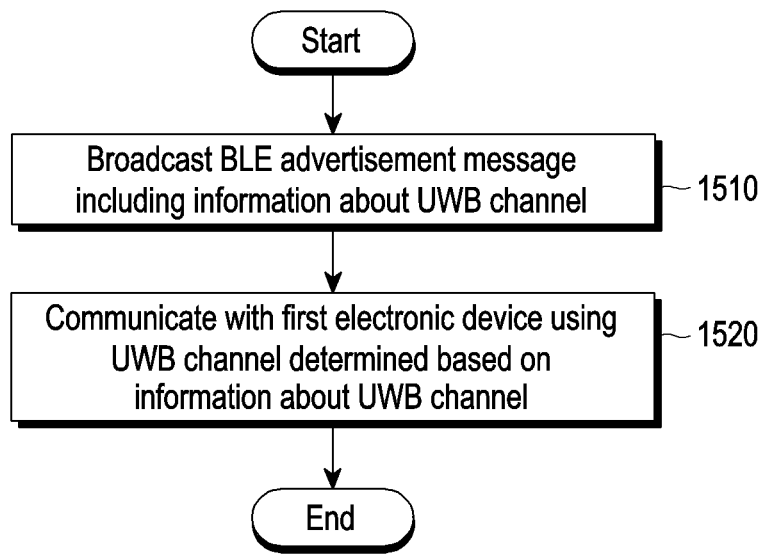
FIG. 15 is a flowchart illustrating a method by a second electronic device according to an embodiment of the disclosure.

FIG. 15 is a flowchart illustrating a method by a second electronic device according to an embodiment of the disclosure.

Referring to FIG. 15, the first electronic device may be, e.g., the UWB device of FIGS. 1 and 2 or the mobile device of FIG. 7, and the second electronic device may be, e.g., the UWB device of FIGS. 1 and 2 or the smart device of FIG.

7 or the BLE anchor of the smart station or the gate device of the smart station. In relation to FIG. 14, no duplicate description is given of those described above in connection with FIGS. 1, 2, 3A, 3B, 4, 5A, 5B, 6, 7, 8, 9, 10, 11, 12, and 13.

The second electronic device may broadcast a BLE advertisement message including information about the UWB channel in operation 1510. In an embodiment of the disclosure, the second electronic device may transmit the BLE advertisement message through the BLE module (anchor). This may reference the description made in connection with FIGS. 12 and 13.

The second electronic device may communicate with the first electronic device using the UWB channel determined based on the information about the UWB channel in operation 1520. In an embodiment of the disclosure, the second electronic device may communicate with the first electronic device through the UWB module. This may reference the description made in connection with FIGS. 12 and 13.

In an embodiment of the disclosure, the information about the UWB channel (UWB channel information) may include the flag information indicating the area and the channel information indicating the UWB channel for the indicated area.

In an embodiment of the disclosure, the flag information may be set to one of the first value indicating the first area, the second value indicating the second area, or the third value indicating that only one UWB channel is used.

In an embodiment of the disclosure, it may be identified that a plurality of UWB channels are operated when the flag information is set to the first value or the second value, and it may be identified that only one UWB channel is used when the flag information is set to the third value.

In an embodiment of the disclosure, the flag information may precede the channel information.

In an embodiment of the disclosure, the information about the UWB channel may be one-byte long, and the flag information may have a length of MSB 2 bits, and the channel information may have a length of LSB 6 bits.

Figure 16:
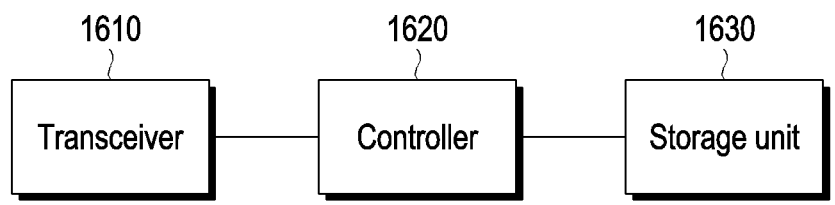
FIG. 16 is a view illustrating a structure of an electronic device according to an embodiment of the disclosure.

FIG. 16 is a view illustrating a structure of an electronic device according to an embodiment of the disclosure.

In the embodiment of FIG. 16, the electronic device may correspond to a UWB device, include a UWB device, or may be an electronic device that may include a portion of a UWB device.

Referring to FIG. 16, the electronic device may include a transceiver 1610, a controller 1620, and a storage unit 1630. In an embodiment of the disclosure, the controller may be defined as a circuit or application-specific integrated circuit or at least one processor.

The transceiver 1610 may transmit and receive signals to/from another entity. The transceiver 1610 may transmit/receive data to/from another device through, e.g., a UWB communication and/or an OOB communication (e.g., BLE).

The controller 1620 may control the overall operation of the electronic device according to an embodiment. For example, the controller 1620 may control inter-block signal flow to perform the operations according to the above-described flowchart. Specifically, the controller 1620 may control the operations (e.g., the operations of the framework) of the electronic device described above with reference to FIGS. 1, 2, 3A, 3B, 4, 5A, 5B, 6, 7, 8, 9, 10, 11, 12, 13, 14, and 15.

The storage unit 1630 may store at least one of information transmitted/received via the transceiver 1610 and information generated via the controller 1620. For example, the storage unit 1630 may store information and data necessary for the method described above with reference to FIGS. 1, 2, 3A, 3B, 4, 5A, 5B, 6, 7, 8, 9, 10, 11, 12, 13, 14, and 15. In an embodiment of the disclosure, the storage unit may include the above-described secure component.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method for operating an ultra-wide band (UWB) channel by a first electronic device, the method comprising:
  receiving, from a second electronic device, a bluetooth low energy (BLE) advertisement message including information about at least one UWB channel used for UWB communication;
  identifying a UWB channel to be used for UWB communication with the second electronic device, based on the information about the at least one UWB channel; and
  performing the UWB communication with the second electronic device using the identified UWB channel,
  wherein the information about the at least one UWB channel includes flag information indicating a zone for UWB communication and channel information indicating a UWB channel for the indicated zone.

2. The method of claim 1, wherein the flag information is set to one of a first value indicating a first zone for UWB communication, a second value indicating a second zone for UWB communication, or a third value indicating that only one UWB channel is used.

3. The method of claim 2, further comprising:
  identifying that a plurality of UWB channels are operated when the flag information is set to the first value or the second value; and
  identifying that only one UWB channel is used when the flag information is set to the third value.

4. The method of claim 1, wherein the flag information precedes the channel information.

5. The method of claim 1,
  wherein the information about the at least one UWB channel is one-byte long, and
  wherein the flag information has a length of most significant bit (MSB) 2 bits, and the channel information has a length of least significant bit (LSB) 6 bits.

6. A method by a second electronic device, the method comprising:
  broadcasting a bluetooth low energy (BLE) advertisement message including information about at least one ultra-wide band (UWB) channel used for UWB communication; and
  performing the UWB communication with a first electronic device using a UWB channel determined based on the information about the at least one UWB channel,
  wherein the information about the at least one UWB channel includes flag information indicating a zone for UWB communication and channel information indicating a UWB channel for the indicated zone.

7. The method of claim 6, wherein the flag information is set to one of a first value indicating a first zone for UWB communication, a second value indicating a second zone for UWB communication, or a third value indicating that only one UWB channel is used.

8. The method of claim 7,
wherein it is identified that a plurality of UWB channels are operated when the flag information is set to the first value or the second value, and
wherein it is identified that only one UWB channel is used when the flag information is set to the third value.

9. The method of claim 6, wherein the flag information precedes the channel information.

10. The method of claim 6,
wherein the information about the at least one UWB channel is one-byte long, and
wherein the flag information has a length of most significant bit (MSB) 2 bits, and the channel information has a length of least significant bit (LSB) 6 bits.

11. A first electronic device, the first electronic device comprising:
a transceiver; and
at least one processor operationally connected with the transceiver, wherein the at least one processor is configured to:
receive, from a second electronic device, a bluetooth low energy (BLE) advertisement message including information about at least one ultra-wide band (UWB) channel used for UWB communication,
identify a UWB channel to be used for UWB communication with the second electronic device, based on the information about the at least one UWB channel, and
performing the UWB communication with the second electronic device using the identified UWB channel,
wherein the information about the at least one UWB channel includes flag information indicating a zone for UWB communication and channel information indicating a UWB channel for the indicated zone.

12. The first electronic device of claim 11, wherein the flag information is set to one of a first value indicating a first zone for UWB communication, a second value indicating a second zone for UWB communication, or a third value indicating that only one UWB channel is used.

13. The first electronic device of claim 12, wherein the at least one processor is further configured to:
identify that a plurality of UWB channels are operated when the flag information is set to the first value or the second value, and
identify that only one UWB channel is used when the flag information is set to the third value.

14. The first electronic device of claim 11, wherein the flag information precedes the channel information.

15. The first electronic device of claim 11,
wherein the information about the at least one UWB channel is one-byte long,
wherein the flag information has a length of most significant bit (MSB) 2 bits, and
wherein the channel information has a length of least significant bit (LSB) 6 bits.

16. A second electronic device, the second electronic device comprising:
a transceiver; and
at least one processor operationally connected with the transceiver,
wherein the at least one processor is configured to:
broadcast a bluetooth low energy (BLE) advertisement message including information about at least one UWB channel used for UWB communication, and
perform the UWB communication with a first electronic device using a UWB channel determined based on the information about the at least one UWB channel, and
wherein the information about the at least one UWB channel includes flag information indicating a zone for UWB communication and channel information indicating a UWB channel for the indicated zone.

17. The second electronic device of claim 16, wherein the flag information is set to one of a first value indicating a first zone for UWB communication, a second value indicating a second zone for UWB communication, or a third value indicating that only one UWB channel is used.

18. The second electronic device of claim 17,
wherein it is identified that a plurality of UWB channels are operated when the flag information is set to the first value or the second value, and
wherein it is identified that only one UWB channel is used when the flag information is set to the third value.

19. The second electronic device of claim 16, wherein the flag information precedes the channel information.

20. The second electronic device of claim 16,
wherein the information about the at least one UWB channel is one-byte long,
wherein the flag information has a length of most significant bit (MSB) 2 bits, and
wherein the channel information has a length of least significant bit (LSB) 6 bits.

* * * * *